United States Patent [19]

Kelly

[11] 4,437,748
[45] Mar. 20, 1984

[54] HIGH ILLUMINATION FLASHBULB ARRAY WITH FIRING SEQUENCE CONTROL MEANS

[75] Inventor: Richard H. Kelly, Issaquah, Wash.

[73] Assignee: The United States of America as represented by the Secretary of the Air Force, Washington, D.C.

[21] Appl. No.: 333,217

[22] Filed: Dec. 21, 1981

[51] Int. Cl.³ .............................................. G03B 15/03
[52] U.S. Cl. ..................................... 354/132; 354/148
[58] Field of Search ............... 354/126, 129, 132, 143, 354/148

[56] References Cited

U.S. PATENT DOCUMENTS

| | | | |
|---|---|---|---|
| 3,676,045 | 7/1972 | Watrous et al. | 431/95 |
| 3,699,861 | 10/1972 | Burgarella et al. | 95/11.5 |
| 3,714,508 | 1/1973 | Harnden et al. | 315/241 |
| 3,728,947 | 4/1973 | Harnden et al. | 95/11.5 R |
| 3,860,856 | 1/1975 | Watrous | 354/129 |
| 3,994,664 | 11/1976 | Casano | 431/95 A |

Primary Examiner—Russell E. Adams
Attorney, Agent, or Firm—Donald J. Singer; Willard R. Matthews

[57] ABSTRACT

Sequential firing of strings of flashbulbs arranged in a parallel array is controlled by a shift register that functions in response to an IC 555 timer. The timer delivers a pulse train (the PRF of which can be set for appropriate firing intervals) that drives the shift register which in turn provides firing signals sequentially from each stage. The firing signals are applied to the gates of silicon controlled rectifiers that are located in each flashbulb string. Firing due to spurious signals is prevented by diodes that short each silicon controlled rectifier gate to ground through a normally closed relay contact. During the arm and fire operational sequence the relay contact opens removing the ground from the silicon controlled rectifiers and enabline their operation.

1 Claim, 1 Drawing Figure

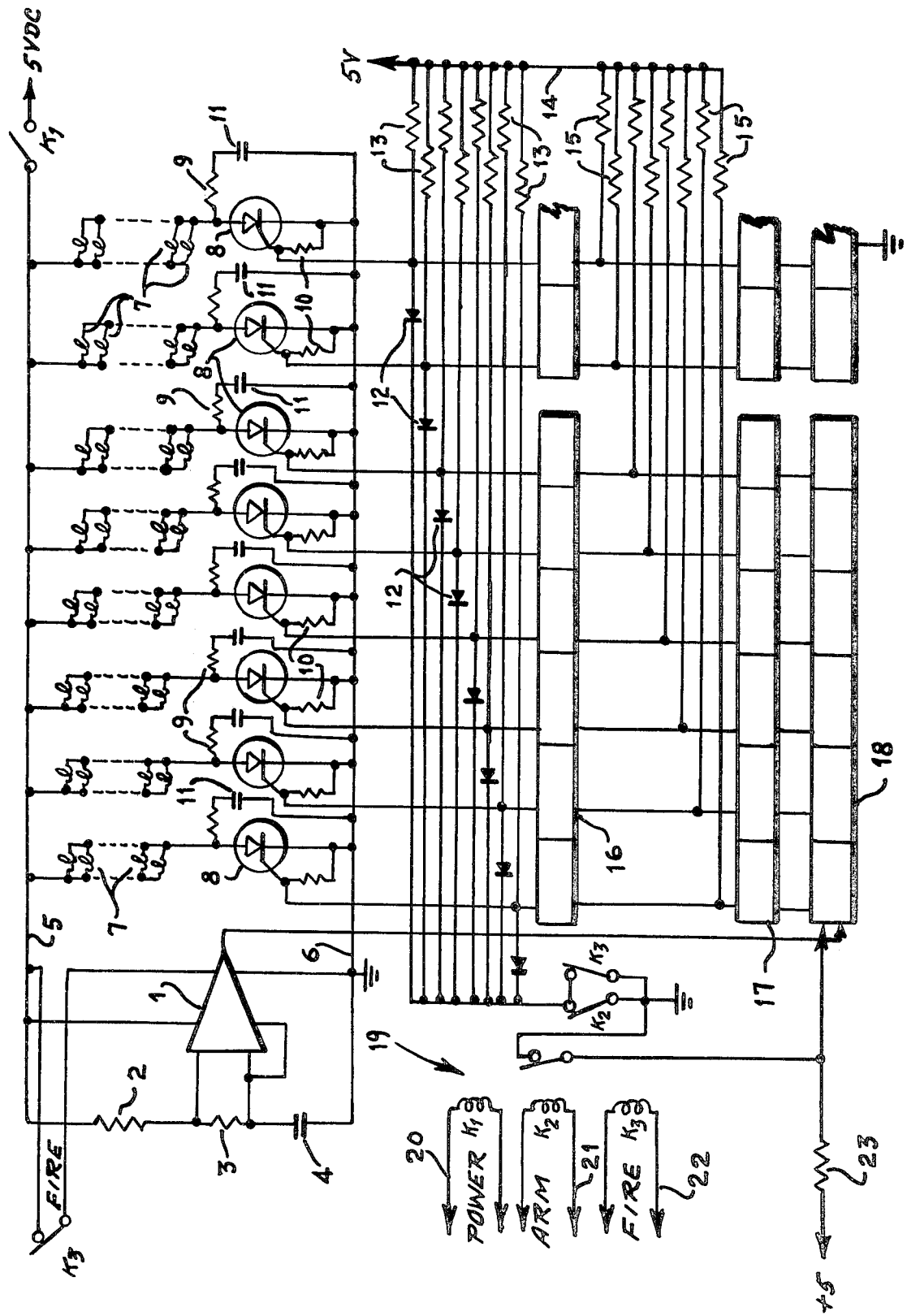

HIGH ILLUMINATION FLASHBULB ARRAY WITH FIRING SEQUENCE CONTROL MEANS

STATEMENT OF GOVERNMENT INTEREST

The invention described herein may be manufactured and used by or for the Government for governmental purposes without the payment of any royalty thereon.

BACKGROUND OF THE INVENTION

This invention relates to high speed motion picture photography and high illumination sources for use therein and in particular to a flashbulb control system for providing controlled light intensity over a given period of time.

Controlled high illumination over fixed periods of time is frequently required in high speed motion picture photography. As an example, a light source of $10^7$ tp $10^8$ lm for a period of 100 ms was required for high speed motion picture photography in the USAF "Have Host" test program. Although tungsten lamps were not capable of producing this it was found that low cost AG-1 flashbulbs would provide $4 \times 10^5$ lm and last about 12 ms. It was determined that if 16 AG-1 bulbs were fired every 12 ms for 8 iterations, the correct intensity would be obtained over the time span required. The basic problem faced, however, was that of arranging and appropriately firing the bulbs in a sequence and time frame that would provide the required high illumination.

Since AG-1 bulbs five sympathetically if in contact with a fired bulb with a delay of about 12 ms it was proposed that 144 bulbs in 8 strings of 18 be cast in clear resin and the center two bulbs of each string ignited. The entire flash block did not ignite as planned however.

Other schemes for firing the bulbs in a controlled manner were also found to be ineffective. Furthermore most states-of-the-art systems were also found to be subject to premature and uncontrolled firing of bulbs as a result of spurious signals.

Accordingly, there currently exists the need for a high illumination flashbulb array with firing sequence control that utilizes inexpensive AG-1 flashbulbs and that is not subject to uncontrolled and premature firing from spurious signals. The present invention is directed toward satisfying that need.

SUMMARY OF THE INVENTION

The invention is a high illuminatin flashbulb array in combination with a firing sequence control circuit. The array consists of a multiplicity of strings of flash bulbs connected in parallel between a power bus and a ground bus. A silicon controlled rectifier switch in each string is used to fire that string of bulbs at an appropriate time in the firing sequence. The gate of each silicon controlled rectifier is connected to a corresponding stage of an IC shift register. The shift register is operated by an IC 555 timer. The PRF of the timer is adjustable to provide for selected firing sequence timing. The shift register outputs are amplified by IC HEX inverter/buffer drivers. Premature and uncontrolled firing of bulbs from spurious signals is prevented by diode that ground the silicon controlled rectifier gates through a normally closed relay contact during power and off control circuit operational sequences. The normally closed relay contact is opened, removing the ground during arm and fire control circuit operational sequences. In a preferred embodiment the array consists of 8 strings of 20 series connected flashbulbs. Each shift register output fires the 20 bulbs from a 5 v source. Time betwen firing pulses is adjustable from 5 ms to 1 second by adjusting the size of the resistor in the RC timing circuit of the 555 timer. The system control circuit also includes relay means for clearing the shift register between operations.

It is a principal object of the invention to provide a new and improved high illumination flashbulb array having firing sequence control.

It is another object of the invention to provide a high illumination flashbulb array with firing sequence control that utilizes inexpensive AG-1 type flashbulbs.

It is another object of the invention to provide a high illuminaton flashbulb array that is not subject to uncontrolled and premature firing from spurious signals.

It is another object of the invention to provide a high illumination flash bulb array with a firing sequence control that has adjustable timing of the firing events.

These together with other objects, features and advantages of the invention will become more readily apparent from the following detailed description when taken in conjunction with the illustrative embodiment in the accompanying drawing.

DESCRIPTION OF THE DRAWING

The sole FIGURE of the drawing is a schematic diagram of the flashbulb array and firing sequence control means of the invention.

DETAILED DESCRIPTION OF THE PREFERRED EMBODIMENT

The high illumination flashbulb array and firing sequence control circuit of the invention is shown schematically in the sole FIGURE of the drawing. Referring thereto the flashbulb array comprises the strings of series connected flashbulbs 7 connected between power bus 5 and ground bus 6. Flashbulbs 7 can be inexpensive AG-1 bulbs and in a preferred embodiment there are 20 bulbs in each string. The firing sequence control circuit comprises, NE 555 timer 1 having or RC timing circuit comprised of resistors 2, 3 and capacitor 4, silicon controlled rectifiers 8 each including the circuit arrangement of resistors 9, 10 and capacitor 11, diodes 12, resistors 13, 15, and 21, shift register 18, amplifier means 16, 17 and a relay shown generally at 19. Timer 1 is an IC device the PRF of which can be adjusted by adjusting the resistance of its RC timing circuit. Shift register 18 can be an IC 74164 TTL/MSI 8 bit serial to parallel converter and amplifier means 16, 17 can be an IC 7406 TTL/SSI HEX inverter buffer/driver. The firing sequence control circuit is operated by a conventional control (not shown) that initiates operation of the circuits of the invention by activating the power, arm and fire relays K1, K2, and K3.

The NE 555 timer 1 is a pulse generator that provides repeatable pulses whose repetition period is adjustable by its R/C PRF control. The output pulses generated are applied as clock pulses to the Shift Register 18. Amplification means 16, 17 amplify the output of the Shift Register to the input required for the silicon controlled rectifier 8.

In operation, power is applied to the circuit by the actuation of $K_1$. The diodes 12 connected to the silicon controlled rectifier gates and connected to the normally closed contacts of $K_2$ and $K_3$ prevent the silicon controlled rectifiers from operating on spurious signals and firing the flash bulbs 7. The other normally closed contact of K$_2$ clears the Shift Register 18 and keeps the input at zero. Actuation of the Arm Relay applies voltage to the timing network of the timing circuit, places a +5 volt level at the input of the Shift Register 18 and removes the ground from the silicon controlled rectifier gates.

The Fire Relay is a relay that actuates in less than one MS applying power to the NE 555 timer 1. Since the timing circuit has been previously energized, a timing pulse is generated immediately and shifts the +5 V into the first stage of the Shift Register 18. This 5 V is current amplified and applied to the gate of silicon controlled rectifer No. 1, firing that string of flashbulbs. Twelve MS later, the timer produces another clock pulse, shifting the +5 V into the next stage of the Shift Register 18, firing the next string of flashbulbs. This process is repeated each time a timing pulse is generated until all flashbulbs are fired.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A high illumination flashbulb array with firing sequence control means comprising
   a power bus,
   a ground bus
   an array of m strings of flashbulbs connected in parallel between said power bus and said ground bus, each string of flashbulbs comprising n flashbulbs connected in series, m and n being integers,
   a switch means in series with each said string of flashbulbs, said switch means being comprised of silicon controlled rectifiers,
   a pulse generator for generating a pulse train having a given PRF, said pulse generator comprising an IC timer having means for varying the PRF thereof,
   an n stage shift register each successive stage thereof being outputted to control a discrete successive switch means in said array in response to said pulse train, said shift register being an IC serial to parallel converter, the output of each said shift register stage being connected to a discrete silicon controller rectifier gate,
   amplification means comprised of an IC HEX inverter buffer/divider for amplifying the outputs of said shift register,
   a control circuit controlling said pulse generator and said shift register to effect sequential firing of said strings of flashbulbs in response to off, power, arm and fire signals, and
   an arm circuit, said arm circuit comprising a diode connected between each said silicon controlled rectifier gate and a grounded normally closed relay contact, said relay contact being opened in response to control circuit arm and fire operational sequences, said arm circuits applying a ground to the gate of said silicon controlled rectifier during off and power control circuit operative sequences and removing said ground during arm and fire operational sequences thereby preventing firing from spurious signals.

* * * * *